US008375452B2

(12) United States Patent
Raviv

(10) Patent No.: US 8,375,452 B2
(45) Date of Patent: Feb. 12, 2013

(54) METHODS FOR USER PROFILING FOR DETECTING INSIDER THREATS BASED ON INTERNET SEARCH PATTERNS AND FORENSICS OF SEARCH KEYWORDS

(75) Inventor: Gil Raviv, Kfar-Yona (IL)

(73) Assignee: Check Point Software Technologies Ltd, Tel Aviv (IL)

( * ) Notice: Subject to any disclaimer, the term of this patent is extended or adjusted under 35 U.S.C. 154(b) by 524 days.

(21) Appl. No.: 12/344,229

(22) Filed: Dec. 25, 2008

(65) Prior Publication Data
US 2010/0169971 A1 Jul. 1, 2010

(51) Int. Cl.
*G06F 11/00* (2006.01)
(52) U.S. Cl. ........................................ 726/25
(58) Field of Classification Search ............... 726/23, 726/25
See application file for complete search history.

(56) References Cited

U.S. PATENT DOCUMENTS

| | | | | |
|---|---|---|---|---|
| 7,278,163 | B2 * | 10/2007 | Banzhof et al. | 726/25 |
| 2003/0212546 | A1 * | 11/2003 | Shaw | 704/9 |
| 2006/0036572 | A1 * | 2/2006 | Kausik | 707/1 |
| 2008/0271143 | A1 * | 10/2008 | Stephens et al. | 726/22 |
| 2009/0282476 | A1 * | 11/2009 | Nachenberg et al. | 726/22 |

OTHER PUBLICATIONS

Yihua Liao "Machine Learning Techniques for Mitigating Insider Threat". Sep. 2002.
Paul Thomson "Weak Models for Insider Threat Detection" White Paper, Dartmouth Collage. 2004.

* cited by examiner

*Primary Examiner* — Cordelia Zecher
(74) *Attorney, Agent, or Firm* — Mark M Friedman

(57) ABSTRACT

Disclosed are methods for user profiling for detecting insider threats including the steps of: upon a client application sending a request for a link, extracting at least one search keyword from a search session associated with the request; classifying the link into at least one classification; determining whether at least one classification is a monitored classification; capturing search elements of search sessions associated with the monitored classification; acquiring usage data from the search elements to create a user profile associated with a user's search behavior; and performing a statistical analysis, on a search frequency for the monitored classification, on user profiles associated with many users. Preferably, the method includes: designating a profile as suspicious based on the statistical analysis exceeding a pre-determined threshold value, wherein the pre-determined threshold value is based on an expected search frequency for the profile and each respective grade for at least one risk-assessment dimension.

14 Claims, 4 Drawing Sheets

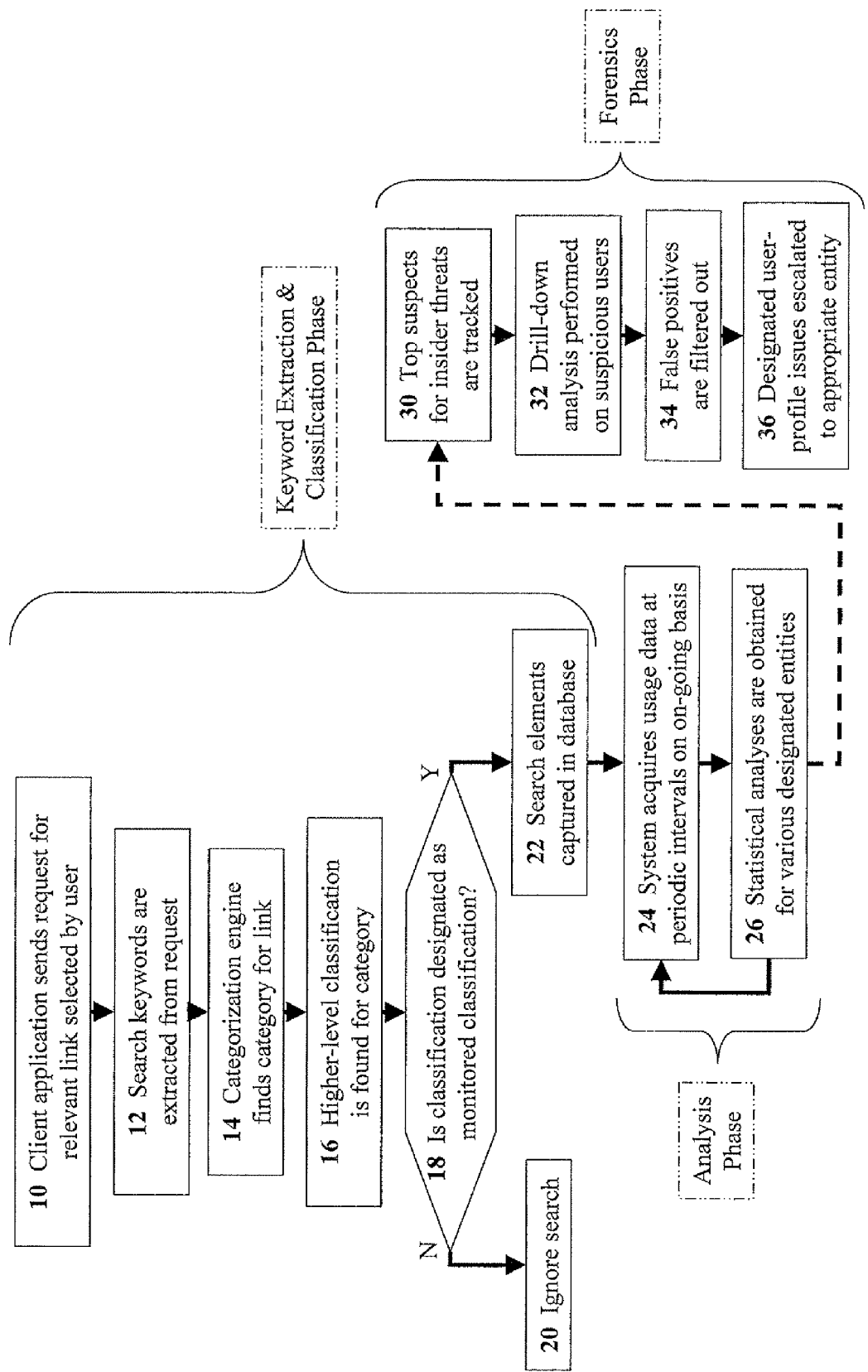

US 8,375,452 B2

METHODS FOR USER PROFILING FOR DETECTING INSIDER THREATS BASED ON INTERNET SEARCH PATTERNS AND FORENSICS OF SEARCH KEYWORDS

FIELD AND BACKGROUND OF THE INVENTION

The present invention relates to methods for user profiling for detecting insider threats based on internet search patterns and forensics of search keywords.

In recent years, security has become an increasing concern in information systems. This issue has become more significant with the advent of the Internet and the ubiquitous use of network environments (e.g. LAN and WAN), both inter- and intra-organizational networks.

In a 2002 presentation entitled, "Machine Learning Techniques for Mitigating Insider Threat," by Yihua Liao at The University of California at Davis (hereinafter referred to as Liao), the term "insider" was defined as anyone who is authorized access to an information system, and the term "insider threat" was defined as the ability to exceed or abuse authorized access to exploit, attack, or misuse information systems.

Insiders pose the greatest threat to national security as well as enterprise interests. According to a 2007 "e-crime" survey, 26% of e-crime events are committed by insiders, and 34% of the organizations surveyed estimate that insiders caused more damage to their organization than outsiders. Such e-crime goes beyond malicious acts on IT (information technology) systems to include: abuse of resources, violation of policies, and use of company facilities to commit crimes, which may have legal or public-relations implications.

According to CERT (Carnegie Mellon University's Computer Emergency Response Team), organizations:

(1) must take a holistic approach to detecting and preventing insider attacks by considering both the technical and the behavioral aspects; and
(2) should establish baselines of normal activities in order to detect anomalies User profiling is a technique for detecting insider misuse by distinguishing one user from another. User profiles include information that characterizes a user's behavior (e.g. commands executed and files accessed). Anomaly detection is used to identify deviations from normal patterns. Anomaly detection relies on the assumption that anomalous behaviors might imply that the system security is being compromised. Anomaly detection tends to generate many false alarms, but may be the only way to detect insider misuses. Liao describes the acquisition of a user profile based on web-browsing behavior for detecting insider threats by adapting to a user's behavioral changes (referred to as "concept drift").

A white paper entitled, "Weak Models for Insider Threat Detection," by Paul Thompson at Dartmouth College (hereinafter referred to as Thompson), discusses how to detect malicious insiders based on their interaction with a large document repository. Thompson primarily focuses on the mechanism, hidden Markov models in this case, used for detection, rather than the categorization of users based on their behavior.

It would be desirable to have methods for user profiling for detecting insider threats based on internet search patterns and forensics of search keywords. Such a methodology would provide a "learning phase" prior to an attack. Such methods would, inter alia, ameliorate some of the problems described above.

SUMMARY OF THE INVENTION

It is the purpose of the present invention to provide methods for user profiling for detecting insider threats based on internet search patterns and forensics of search keywords.

Typical security solutions focus on the anomalies from the victim's side (e.g. servers under attack), and not on the attacker. In preferred embodiments of the present invention, methods enable the potential attacker to be monitored on an increasing level of scrutiny as the potential attacker's intentions become malicious, and his/her knowledge becomes risky to the organization.

In preferred embodiments of the present invention, a basic conceptual framework is used as a foundation for user profiling. Principles within the framework include:
(1) a user's IT-related behavior leaves "fingerprints";
(2) detection and collection of the fingerprints can enable capture of the user's profile; and
(3) anomaly detection of the profile can help to:
    (a) identify problematic users;
    (b) predict attacks; and
    (c) prevent attacks before the user decides to attack.

User profiling can be used to visualize user profiles, department profiles, organizational profiles, and multi-dimensional profiles. User profiling can be integrated with other solutions to mitigate threats. User profiles can be generally based on the following dimensions for risk-assessment purposes.
(1) Knowledge/Skill—does the user know how to attack?
(2) Intent—does the user have malicious intentions?
(3) Accessibility—how many steps are required for the user to get to the target destination?
(4) Reputation—is the user known to be involved in security incidents?

In preferred embodiments of the present invention, search keywords are used as a source of information for the first two dimensions (i.e. knowledge/skill and intent). A user's search-strategy can provide insight into the user's intent for the searches (e.g. current interests and new areas of learning). Users with the same organizational roles should have similar search patterns. Preferred embodiments of the present invention provide methods for classifying users according to their search keywords and keyword classifications, and for identifying small, focused groups of potential suspects for insider threats.

The four risk-assessment dimensions (i.e. knowledge/skill, intent, accessibility, and reputation) extend the usefulness of such schemes by allowing system operators to perform forensic activities on more than just the keyword searches. For example, the knowledge/skill dimension can be assessed using additional factors (e.g. the use of sophisticated programs by users). After monitoring user behavior for some time, the system can provide a knowledge/skill "grade" for each user, department, and or organization on the system. Another example is when a user has high grades for both the reputation and accessibility dimensions. Such a user poses a greater potential risk than others, and may be designated by the system as suspicious.

Therefore, according to the present invention, there is provided for the first time a method for user profiling for detecting insider threats, the method including the steps of: (a) upon a client application sending a request for a URI (Uniform Resource Identifier) web link, extracting at least one search keyword from a search session associated with the request; (b) classifying the URI web link into at least one classification; (c) determining whether at least one classification is a monitored classification; (d) capturing search elements of search sessions associated with the monitored classification;

(e) acquiring usage data from the search elements to create a user profile associated with a user's search behavior; and (f) performing a statistical analysis, on a search frequency for the monitored classification, on user profiles associated with many users.

Preferably, the step of classifying includes categorizing the URI web link into at least one category, and wherein at least one category is included in at least one classification.

Preferably, the step of performing the statistical analysis yields a respective grade in at least one risk-assessment dimension selected from the group consisting of: knowledge/skill, intent, accessibility, and reputation.

More preferably, the method further includes the step of: (g) designating a user profile as suspicious based on the statistical analysis exceeding a pre-determined threshold value, wherein the pre-determined threshold value is based on an expected search frequency for the user profile and each respective grade for at least one risk-assessment dimension.

More preferably, the method further includes the step of: (h) segmenting the statistical analysis according to an organizational department associated with the user profile.

Most preferably, the expected search frequency is dependent on the organizational department.

Preferably, the step of acquiring is performed periodically in order to provide a time-dependent component to the user profile.

More preferably, the time-dependent component is used to modify an expected search frequency.

More preferably, the step of performing the statistical analysis yields a respective grade in at least one risk-assessment dimension selected from the group consisting of: knowledge/skill, intent, accessibility, and reputation.

Most preferably, the method further includes the step of: (g) designating a user profile as suspicious based on the statistical analysis exceeding a pre-determined threshold value, wherein the pre-determined threshold value is based on the expected search frequency for the user profile and each respective grade for at least one risk-assessment dimension.

According to the present invention, there is provided for the first time a computer-readable storage medium having computer-readable code embodied on the computer-readable storage medium, the computer-readable code including: (a) program code for, upon a client application sending a request for a URI (Uniform Resource Identifier) web link, extracting at least one search keyword from a search session associated with the request; (b) program code for classifying the URI web link into at least one classification; (c) program code for determining whether at least one classification is a monitored classification; (d) program code for capturing search elements of search sessions associated with the monitored classification; (e) program code for acquiring usage data from the search elements to create a user profile associated with a user's search behavior; and (f) program code for performing a statistical analysis, on a search frequency for the monitored classification, on user profiles associated with many users.

Preferably, the program code for classifying includes program code for categorizing the URI web link into at least one category, and wherein at least one category is included in at least one classification.

Preferably, the program code for performing the statistical analysis is operative to yield a respective grade in at least one risk-assessment dimension selected from the group consisting of: knowledge/skill, intent, accessibility, and reputation.

More preferably, the computer-readable code further includes: (g) program code for designating a user profile as suspicious based on the statistical analysis exceeding a pre-determined threshold value, wherein the pre-determined threshold value is based on an expected search frequency for the user profile and each respective grade for at least one risk-assessment dimension.

More preferably, the computer-readable code further includes: (h) program code for segmenting the statistical analysis according to an organizational department associated with the user profile.

Most preferably, the expected search frequency is dependent on the organizational department.

Preferably, the program code for acquiring is operative to be performed periodically in order to provide a time-dependent component to the user profile.

More preferably, the time-dependent component is used to modify an expected search frequency.

More preferably, the program code for performing the statistical analysis is operative to yield a respective grade in at least one risk-assessment dimension selected from the group consisting of: knowledge/skill, intent, accessibility, and reputation.

Most preferably, the computer-readable code further includes: (g) program code for designating a user profile as suspicious based on the statistical analysis exceeding a pre-determined threshold value, wherein the pre-determined threshold value is based on the expected search frequency for the user profile and each respective grade for at least one risk-assessment dimension.

These and further embodiments will be apparent from the detailed description and examples that follow.

BRIEF DESCRIPTION OF THE DRAWINGS

The present invention is herein described, by way of example only, with reference to the accompanying drawings, wherein:

FIG. 4 is a simplified flowchart of the major operational steps for the keyword extraction/classification and analysis phases for user profiling for detecting insider threats, according to preferred embodiments of the present invention;

FIG. 5 is a simplified flowchart of the major operational steps for the forensics phase for user profiling for detecting insider threats, according to preferred embodiments of the present invention.

DESCRIPTION OF THE PREFERRED EMBODIMENTS

The present invention relates to methods for user profiling for detecting insider threats based on internet search patterns and forensics of search keywords. The principles and operation for user profiling for detecting insider threats, according to the present invention, may be better understood with reference to the accompanying description and the drawings.

Whenever a user is searching for something on a network (e.g. the Internet), search keywords, and the resulting URLs (Uniform Resource Locator) that the user accesses, can be captured. Keywords can also be extracted from the HTTP "referrer" field. The URLs can be categorized (using common URL categorization methods), and a relevant classification for the URL category can be designated. Commonly-used categories include adult-, drug-, hacking-, gambling-, and weapons-related content. Eventually, a profile for every user can be built with reporting parameters for each user in each classification. For example, such reporting parameters can include the frequency of searches and statistical characteristics of the search frequency (e.g. a user that searched for hacking sites over numerous sessions has a different user profile than a user that searched for the same sites in a single session). Furthermore, false positives can be reduced by fine-tuning of category types.

Figure 1:
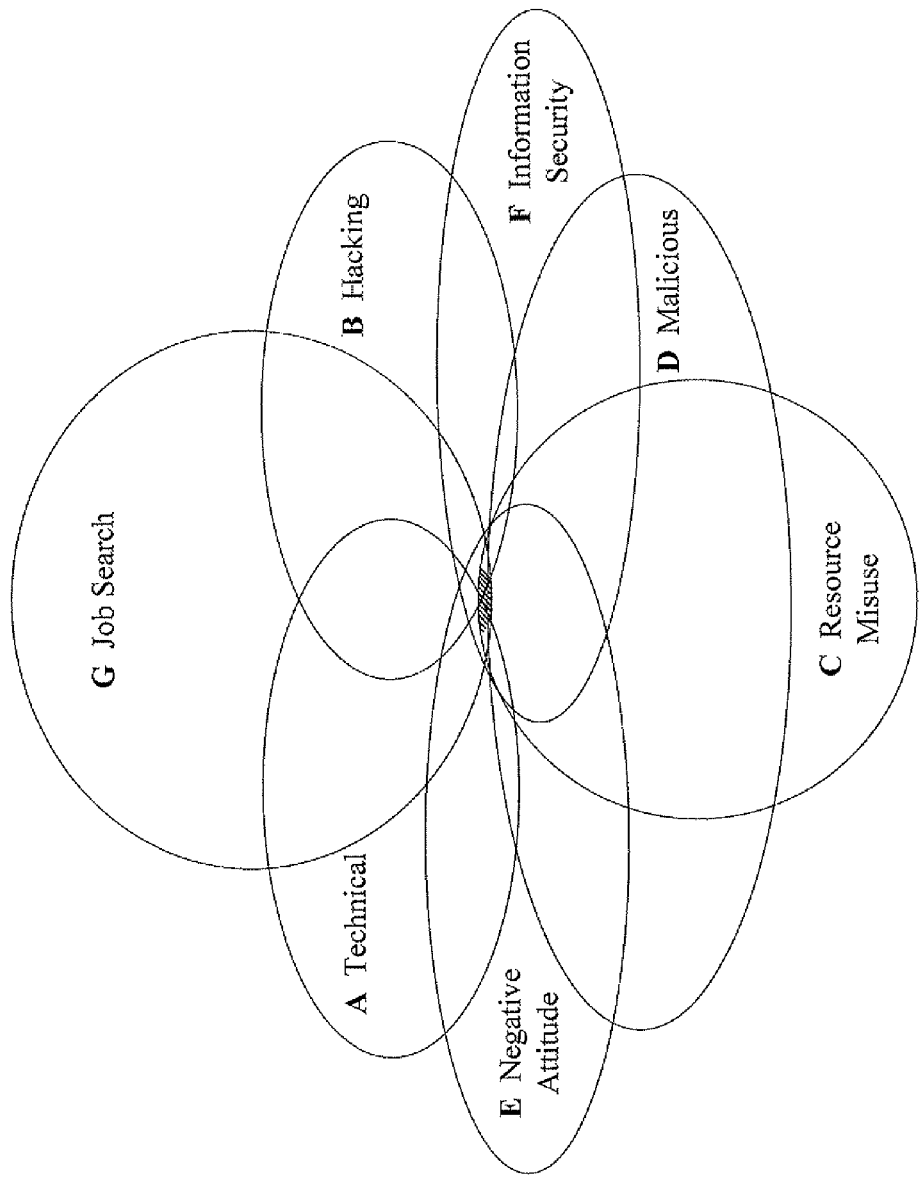
FIG. 1 is a Venn diagram of exemplary category clusters made from combinations of classifications used in user profiling for detecting insider threats, according to preferred embodiments of the present invention.

Referring now to the drawings, FIG. 1 is a Venn diagram of exemplary category clusters made from combinations of classifications used in user profiling for detecting insider threats, according to preferred embodiments of the present invention. Only a small group of users can be members of all category clusters (as indicated in FIG. 1 by the shaded region). Exemplary category clusters A-G (and examples of combinations of classifications) include:
  (A) Technical—for example, technical information, software/hardware, shareware/freeware, resource sharing, technical/business forums, and remote access;
  (B) Hacking—for example, hacking/computer crime and criminal activities;
  (C) Resource Misuse—for example, Peer-to-Peer (P2P)/ file-sharing, streaming media, and "anonymizers";
  (D) Malicious—for example, "phishing" and shareware/ freeware;
  (E) Negative Attitude—for example, websites related to adult content, violence, hate, drugs, weapons, and gambling;
  (F) Information Security; and
  (G) Job Search.

The classification of a category (e.g. the "gambling" category classified in Negative Attitude category-cluster E) can be customized by the security administrator to better reflect the organization's values, code of ethics, and rules. Once a profile for every user has been acquired, users can be identified with a relative ranking (e.g. high, medium, and low) for the search rates in each classification. From such a ranking, focus groups of unique user profiles can be gathered which may deserve further attention. Examples of such focus groups can include:
  (1) hacking users—all users with high search rates of hacking sites;
  (2) hacking/non-technical users—all users with high search rates of hacking sites that had no searches for technical sites; and
  (3) hacking/technical/job search users technical users that also sought new jobs and learned how to back.

Such an approach allows investigation of numerous profile focus groups with specific attributes including:
  (1) technical users that appear in nontechnical groups; and
  (2) new hacking users that searched for hacking sites outside their job roles.

Once suspicious focus groups have been identified, a list of the search keywords that were used by such users can be generated. The keywords can be grouped by the relevant classifications (e.g. hacking), and can assist in forensic activity for information security.

Figure 2:
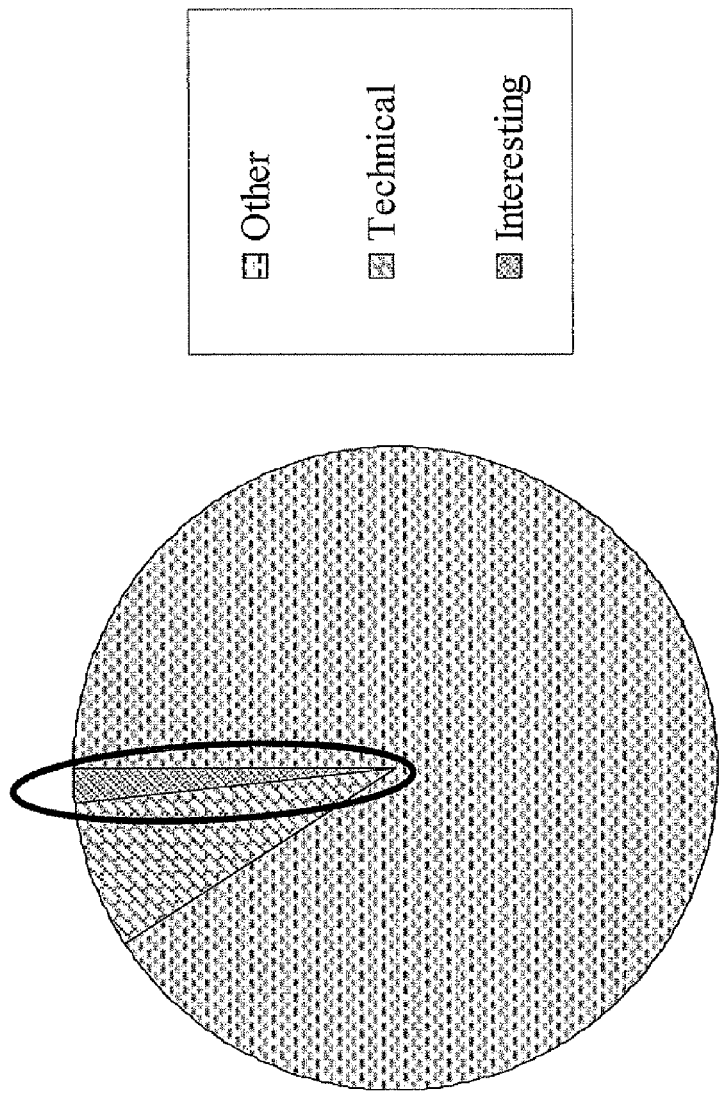
FIG. 2 is an exemplary pie-chart distribution of user profiles based on three broad categories, according to preferred embodiments of the present invention.

FIG. 2 is an exemplary pie-chart distribution of user profiles based on three broad categories, according to preferred embodiments of the present invention. The distribution represents user profiles that performed searches under the designated categories. The majority of the pie chart is designated as "other" for simplicity. It is noted that a majority of the user-profile searches can be filtered out. Isolating only the category of "interesting" user profiles, a "drill-down" analysis can be performed on the dataset to obtain more information.

Figure 3:
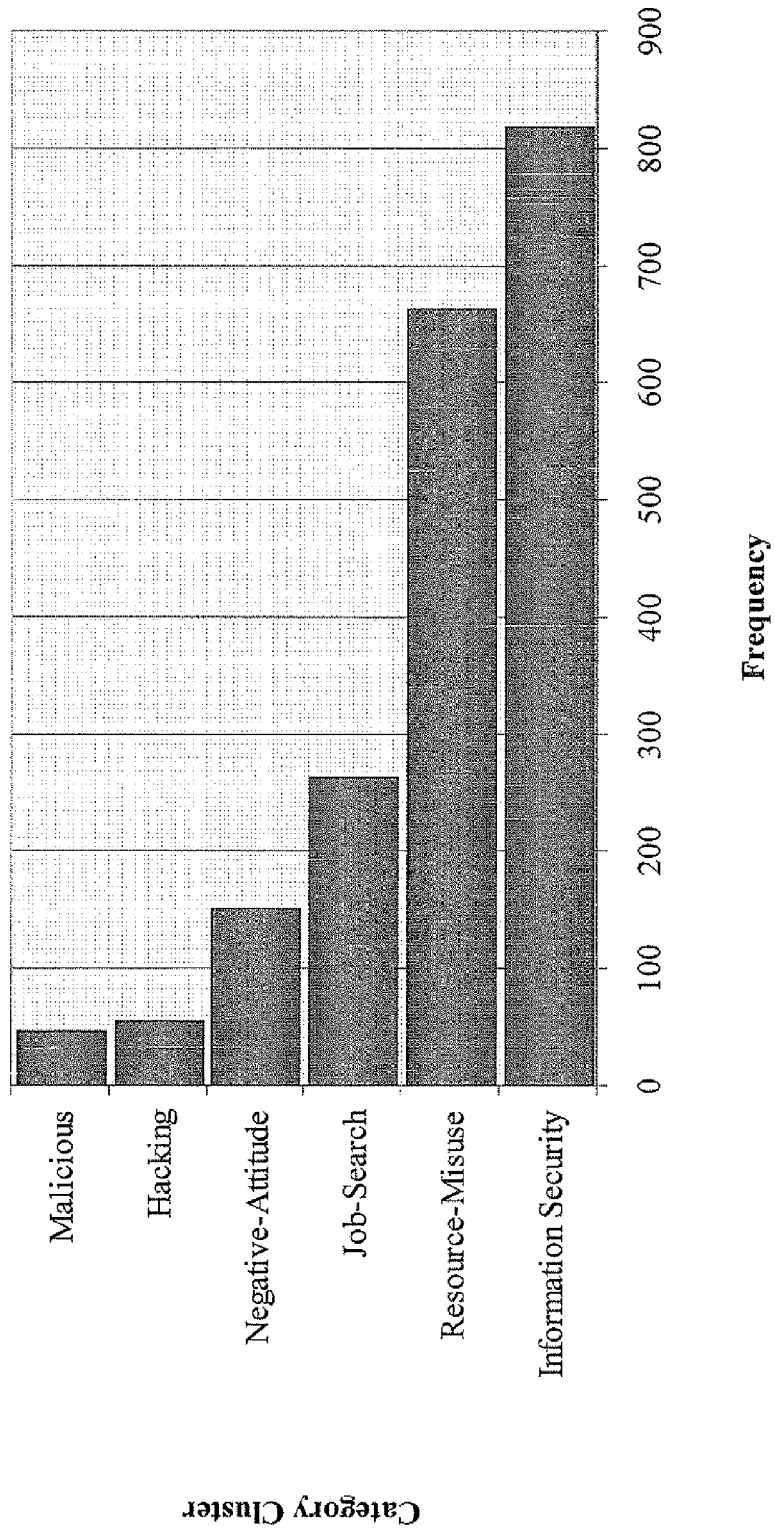
FIG. 3 is a frequency graph of the exemplary category clusters for the categories of interesting user profiles of FIG. 2, according to preferred embodiments of the present invention.

FIG. 3 is a frequency graph of the exemplary category clusters for the categories of interesting user profiles of FIG. 2, according to preferred embodiments of the present invention. Note that the graph requires a sampling of the complete database at a periodic interval (e.g. monthly). Thus, user profiles can provide "snapshots" in time of user behavior (e.g. performing job searches during a period of company instability). Furthermore, search-activity monitoring can be configured to factor in such time-dependent effects. Further refined analysis can be performed according to the needs of the security administrator.

The user-profiling scheme, as described herein, can be broken down into three phases: a keyword extraction and classification phase, an analysis phase, and a forensics phase. The process starts after a user, searching for something by typing some keywords in a client application (e.g. web browser) operationally connected to a network (e.g. the Internet), retrieves a results page, and clicks on all interesting link (i.e. a Uniform Resource Identifier (URI)) in the results page.

FIG. 4 is a simplified flowchart of the major operational steps for the keyword extraction/classification and analysis phases for user profiling for detecting insider threats, according to preferred embodiments of the present invention. The client application sends a request (e.g. HTTP (Hypertext Transfer Protocol) request) for the relevant link (Step 10). The search keywords are then extracted from the request (Step 12). Search keywords are only extracted for searches that are deemed successful (i.e. upon receiving the results of a search, the user selected one of the links in the results page to generate a request). For example, if a user performs three searches, modifying the search keywords for each search, but only selects a link from the results of the third search, then only the search keywords for the third search are extracted.

A categorization engine finds the category for the link (e.g. "gambling") (Step 14). The relevant higher-level classification is found for the category (e.g. the "gambling" category is classified in Negative Attitude category-cluster E; of FIG. 1) (Step 16). The system checks whether the classification is designated as being a monitored classification (e.g. as configured by a forensics administrator) (Step 18). If the classification is not a monitored classification, then the search is ignored by the system (Step 20). If the classification is a monitored classification, then search elements (e.g. user, keywords, category, classification, time, and link (URI)) are captured in the system's database (Step 22).

The analysis phase continues in FIG. 4 with the system acquiring usage data from the database at periodic intervals (e.g. monthly) on an on-going basis (Step 24). Statistical analyses are obtained for various designated entities (e.g. users, departments, and organizations) at each interval (Step 26). As mentioned above, such sampling provides a time-dependent component to the user profile.

As an example of the statistical analyses that can be performed, the following embodiments are described. For each user, the number of searches the user conducted in each monitored classification, and the standard deviation for the frequency of searches for each monitored classification are calculated. For each department, users' searches in each monitored classification are determined and grouped, and the standard deviation for the frequency of searches for each monitored classification is calculated. For an entire organization, department searches in each monitored classification are determined and grouped, and the standard deviation for the frequency of searches for each monitored classification is calculated.

FIG. 5 is a simplified flowchart of the major operational steps for the forensics phase for user profiling for detecting insider threats, according to preferred embodiments of the present invention. The forensics phase is performed by an operator of the system (e.g. forensics administrator). The top "suspects" for insider threats are tracked (e.g. by a combination of classifications, or by a list of drastic changes in the frequency patterns of users) (Step 30). The exemplary embodiments described with regard to FIGS. 2-3 are indicative of a forensic analysis. For example, a user that suddenly shows an interest in hacking websites, or learning new technical skills that are not in the scope of his/her work, would raise an alert to an operator. The time-dependent nature of the user profiles can be used to correlate other events with the user's search behavior (e.g. an increase in malicious sites after the user received a poor performance review).

The operator can then perform a "drill-down" analysis on the profiles for each suspicious user to find information (e.g. suspected keywords, and reports on the frequency of searches for the problematic classifications) (Step 32). The operator can "filter out" user profiles that exhibit behavior determined to be acceptable (i.e. false positives) (Step 34). The operator can use an external ticketing system, for example, to escalate designated user-profile issues to appropriate entity (e.g. security, legal, and/or human resource departments) for review and/or action (Step 36).

While the invention has been described with respect to a limited number of embodiments, it will be appreciated that many variations, modifications, and other applications of the invention may be made.

What is claimed is:

1. A method for user profiling for detecting insider threats, the method comprising the steps of:
    (a) upon a client application sending a request for a URI (Uniform Resource Identifier) web link, extracting at least one search keyword from a search session associated with said request;
    (b) classifying said URI web link into at least one classification;
    (c) determining whether said at least one classification is a monitored classification;
    (d) capturing search elements of search sessions associated with said monitored classification;
    (e) acquiring usage data from said search elements to create a user profile associated with a user's search behavior;
    (f) monitoring a level of sophistication of software used by said user; and
    (g) performing a statistical analysis, on a search frequency for said monitored classification and on said level of sophistication, on user profiles associated with many users, to yield a respective grade in knowledge/skill.

2. The method of claim 1, wherein said step of classifying includes categorizing said URI web link into at least one category, and wherein said at least one category is included in said at least one classification.

3. The method of claim 1, the method further comprising the step of
    (h) designating a user profile as suspicious based on said statistical analysis exceeding a pre-determined threshold value, wherein said pre-determined threshold value is based on an expected search frequency for said user profile and each said respective grade for said at least one risk-assessment dimension.

4. The method of claim 3, the method further comprising the step of:
    (i) segmenting said statistical analysis according to an organizational department associated with said user profile.

5. The method of claim 4, wherein said expected search frequency is dependent on said organizational department.

6. The method of claim 1, wherein said step of acquiring is performed periodically in order to provide a time-dependent component to said user profile.

7. The method of claim 6, wherein said time-dependent component is used to modify an expected search frequency.

8. A non-transitory computer-readable storage medium having computer-readable code embodied on the non-transitory computer-readable storage medium, the computer-readable code comprising:
    (a) program code for, upon a client application sending a request for a URI (Uniform Resource Identifier) web link, extracting at least one search keyword from a search session associated with said request;
    (b) program code for classifying said URI web link into at least one classification;
    (c) program code for determining whether said at least one classification is a monitored classification;
    (d) program code for capturing search elements of search sessions associated with said monitored classification;
    (e) program code for acquiring usage data from said search elements to create a user profile associated with a user's search behavior;
    (f) program code for monitoring a level of sophistication of software used by said user; and
    (g) program code for performing a statistical analysis, on a search frequency for said monitored classification and on said level of sophistication, on user profiles associated with many users, to yield a respective grade in knowledge/skill.

9. The storage medium of claim 8, wherein said program code for classifying includes program code for categorizing said URI web link into at least one category, and wherein said at least one category is included in said at least one classification.

10. The storage medium of claim 8, the computer-readable code further comprising:
    (h) program code for designating a user profile as suspicious based on said statistical analysis exceeding a pre-determined threshold value, wherein said pre-determined threshold value is based on an expected search frequency for said user profile and each said respective grade for said at least one risk-assessment dimension.

11. The storage medium of claim 10, the computer-readable code further comprising:
    (i) program code for segmenting said statistical analysis according to an organizational department associated with said user profile.

12. The storage medium of claim 11, wherein said expected search frequency is dependent on said organizational department.

13. The storage medium of claim 8, wherein said program code for acquiring is operative to be performed periodically in order to provide a time-dependent component to said user profile.

14. The storage medium of claim 13, wherein said time-dependent component is used to modify an expected search frequency.

* * * * *